United States Patent [19]
Takahashi et al.

[11] Patent Number: 4,759,229
[45] Date of Patent: Jul. 26, 1988

[54] CONTROLLING TRANSMISSION

[75] Inventors: Takashi Takahashi, 26-18, Kamisoshigaya 1, Setagaya-ku, Tokyo 157; Kinichi Endo, Hachioji, both of Japan

[73] Assignee: Takashi Takahashi, Tokyo, Japan

[21] Appl. No.: 27,383

[22] Filed: Mar. 18, 1987

[30] Foreign Application Priority Data

Sep. 12, 1986 [JP] Japan .................. 61-215695

[51] Int. Cl.4 .............................................. F16H 55/18
[52] U.S. Cl. ......................................... 74/409; 74/392; 74/810
[58] Field of Search ................. 74/801, 409, 810, 392, 74/397, 788; 403/362, 373, 375

[56] References Cited

U.S. PATENT DOCUMENTS

| 503,865 | 8/1893 | Lovelace | 403/375 |
|---|---|---|---|
| 1,549,845 | 8/1925 | Münz | 74/397 |
| 2,382,846 | 8/1945 | Barber | 74/397 |
| 2,501,034 | 3/1950 | Derbyshire | 74/801 |
| 2,770,983 | 11/1956 | Hatala | 403/375 |
| 3,635,103 | 1/1972 | Monti | 74/801 |
| 4,561,816 | 12/1985 | Dingess | 901/25 |

FOREIGN PATENT DOCUMENTS

| 0654693 | 12/1937 | Fed. Rep. of Germany | 74/801 |
|---|---|---|---|
| 0050253 | 3/1984 | Japan | 74/801 |
| 0115880 | 2/1946 | Sweden | 74/801 |
| 1013656 | 4/1983 | U.S.S.R. | 74/801 |

Primary Examiner—Leslie A. Braun
Assistant Examiner—Scott Anchell
Attorney, Agent, or Firm—Armstrong, Nikaido, Marmelstein & Kubovcik

[57] ABSTRACT

Herein disclosed is a controlling transmission to be used with an industrial robot or the like, which is constructed of a planetary or star gear mechanism having at least one pair of intermediate gears arranged between a sun gear and an internal gear. The paired intermediate gears are set by the movement adjustment of a movement adjusting mechanism such that one of them has its back-lash eliminated with respect to the rotations in the clockwise direction whereas the other has its back-lash eliminated with respect to the rotations in the counter-clockwise direction.

6 Claims, 5 Drawing Sheets

CONTROLLING TRANSMISSION

BACKGROUND OF THE INVENTION

The present invention relates to a transmission which has its rotating direction switched forward or backward during its run so that it may be used with a control apparatus such as an industrial robot.

The control apparatus such as the industrial robot is run while its transmission shaft having the rotating direction not limited to one direction but temporarily switched forward or backward. On the other hand, the gears of a transmission to be used with such control apparatus never fail to be accompanied by the back-lash. Because of the presence of this back-lash, there has been pointed a problem that the rotations are delayed to the extent of the back-lash, each time their direction is switched forward or backward, to make the transmission inaccurate.

In order to eliminate that inaccuracy of transmission due to the back-lash, according to the prior art, there has been proposed a mechanism or the like, in which dual gears are superposed and shifted in phase by the back-lash so that their surfaces may come into meshing engagement with the zero back-lash. Despite this proposal, however, the back-lash contains such an error as is inevitably caused by the machining. It is, therefore, drastically difficult for the indexing accuracy that the two gears are fixed on their shafts with the phase shift of the back-lash having such fine error.

Moreover, the aforementioned two-gear superposed mechanism has failed to avoid the fatal wedge action which is established by the two-surface meshing engagement, which in turn raises a cause for making a smooth run difficult.

SUMMARY OF THE INVENTION

An object of the present invention is to provide a controlling transmission which is enabled to switch the rotating direction of its transmission shaft forward or backward by making use of a planetary gear mechanism or a star gear mechanism (i.e., the gear mechanism of the type in which intermediate gears have fixed shafts whereas an internal gear is made rotatable).

Another object of the present invention is to provide a controlling transmission which is enabled to have an accurate and smooth transmission by reducing the back-lash substantially to zero.

In order to achieve the above-specified objects, the transmission of the present invention makes use of the planetary or star gear mechanism and has at least one pairs of intermediate gears arranged between a sun gear and the internal gear. These paired intermediate gears are characterized in that their supporting intermediate shafts are adjusted to move substantially in a circumferential direction on the axis of the sun gear by a later-described movement adjusting mechanism such that one of the intermediate shafts has its back-lash eliminated to zero with respect to the clockwise direction whereas the other has its back-lash eliminated to zero with respect to the counter-clockwise direction.

With this construction, an input shaft can be switched instantly without any rotational delay corresponding to the back-lash, when its rotating direction is switched, and the rotations during the run can be smoothed.

The aforementioned movement adjusting mechanism can be simply constructed by connecting the intermediate shafts supporting the intermediate gears, with an eccentricity, to rods for supporting the intermediate shafts. Moreover, it is preferable that the intermediate gears of the present invention be borne on their intermediate shafts through floating intermediate rings. Through these floating intermediate rings, narrow clearances are formed between the floating intermediate rings and the intermediate gears to absorb the rotational fluctuations, which are caused due to the machining errors of the gears by those clearances, to ensure the more smooth rotations.

THE PREFERRED EMBODIMENTS

Figure 1:
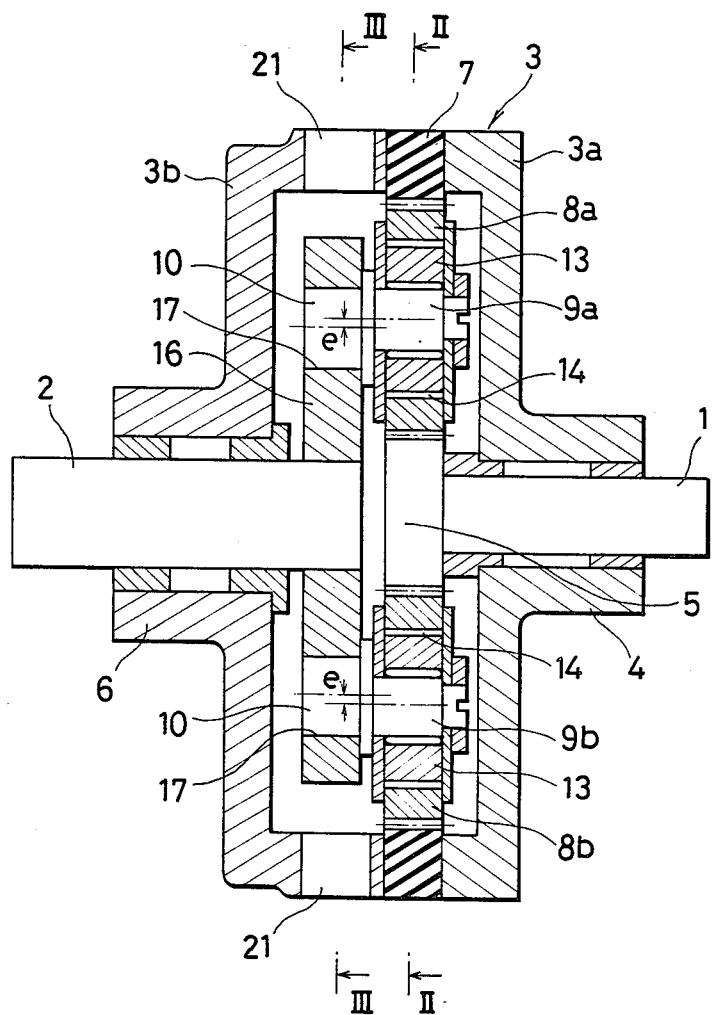
FIG. 1 is a longitudinal section showing a transmission according to an embodiment of the present invention.
Figure 2:
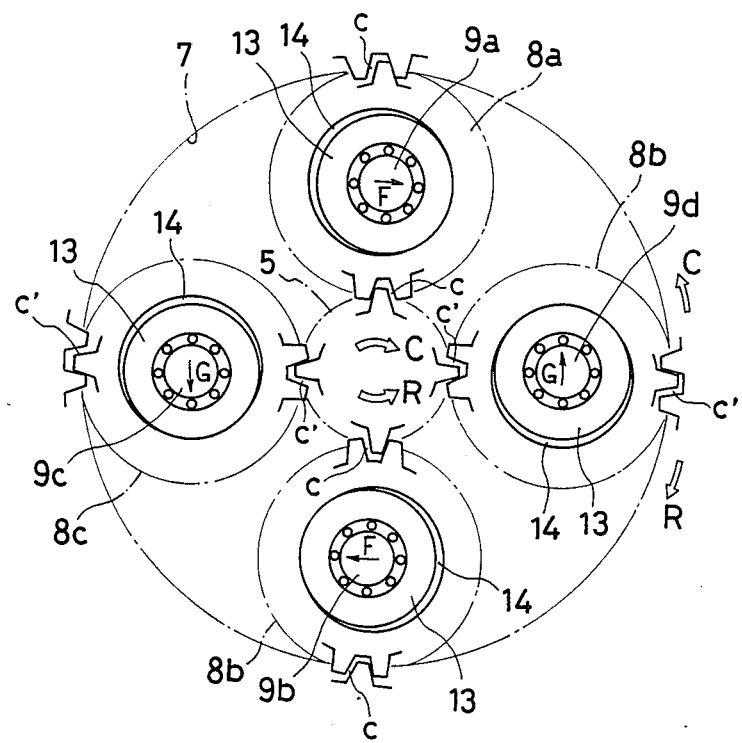
FIG. 2 is a schematic section showing the state viewed in the direction of arrows II—II of FIG. 1.
Figure 3:
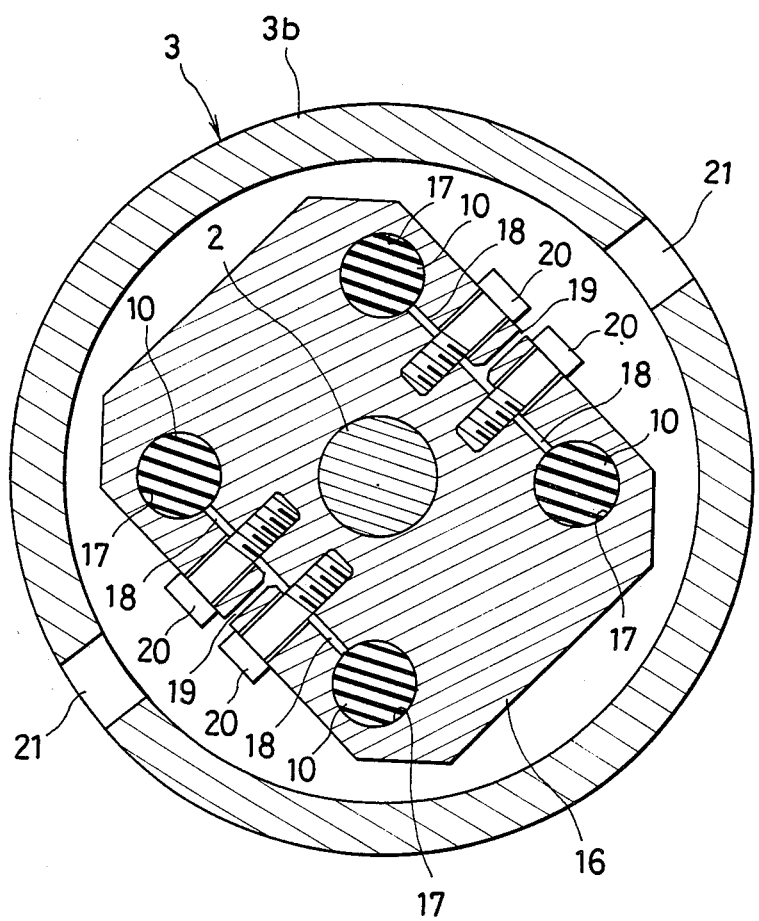
FIG. 3 is a section showing the state viewed in the direction of arrows III—III of FIG. 1.

The embodiment of FIGS. 1 to 3 presents one example of the controlling transmission which makes use of a planetary gear mechanism having two pairs of intermediate gears as the planetary gears.

In these Figures, reference numerals 1, 2 and 3 denote an input shaft, an output shaft and a casing, respectively. In this embodiment, the casing 3 is divided into brackets 3a and 3b, between which is sandwiched an internal gear 7. The input shaft 1 is rotatably borne by a bearing 4 of the bracket 3a and has a sun gear 5 fixed on its inner end. On the other hand, the output shaft 2 is rotatably borne by a bearing 6 of the bracket 3b. Two pairs of equidistantly arranged intermediate gears 8a and 8b, and 8c and 8d are interposed to mesh with the sun gear 5 and the internal gear 7, thus constituting a planetary gear mechanism. In this embodiment, the sun gear 5, the internal gear 7 and intermediate gears 8a, 8b, 8c and 8d are made of spur gears without any exception.

Figure 4:
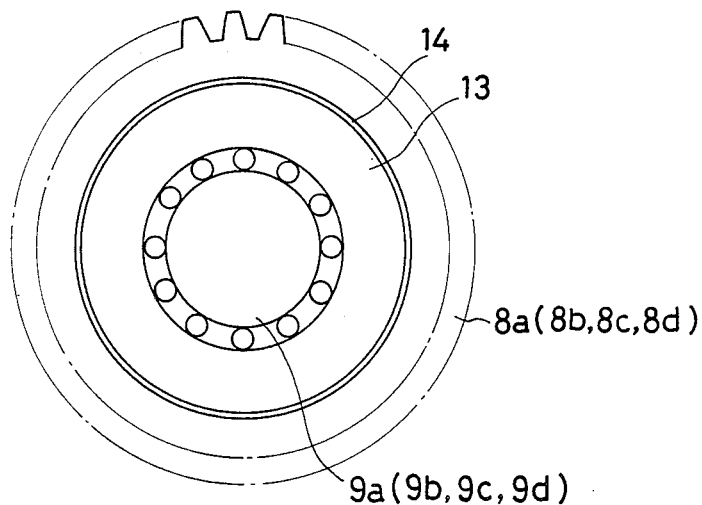
FIG. 4 is a front elevation showing a portion of an intermediate gear used in the transmission of FIG. 1.
Figure 5:
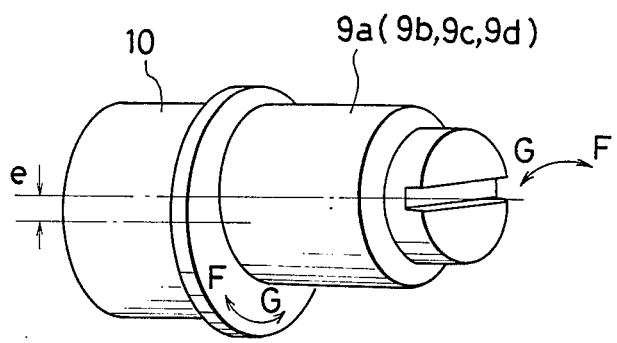
FIG. 5 is a perspective view showing the movement adjusting mechanism of the transmission of FIG. 1.

The aforementioned two-paired intermediate gears 8a, 8b, 8c and 8d are rotatably borne on intermediate shafts 9a, 9b, 9c and 9d, respectively, through floating intermediate rings 13, 13, 13 and 13. As shown in FIG. 4, more specifically, the floating intermediate rings 13, 13, 13 and 13 are rotatably borne through bearings on the intermediate shafts 9a, 9b, 9c and 9d, and the intermediate gears 8a, 8b, 8c and 8d are fitted on those floating intermediate rings 13, 13, 13 and 13 through narrow clearances 14 capable of forming oil films. This clearance 14 is shown in FIGS. 1, 2 and 4 in an enlarged scale for explaining the later-described effects but is in fact made so small as to optimize the formation of the oil film.

The aforementioned intermediate shafts 9a, 9b, 9c and 9d are fixed through their integrated rods 10, 10, 10 and 10 on a carrier 16, which in turn is fixed on the output shaft 2, by means of a later-described support mechanism. Moreover, the support rods 10, 10, 10 and 10 connect the intermediate shafts 9a, 9b, 9c and 9d each with an eccentricity e, thus constituting a later-described movement adjusting mechanism. Thanks to this movement adjusting mechanism, the intermediate shafts 9a, 9b, 9c and 9d have their movements adjusted on the respective axes of the rods 10 by the rotations of the respective rods 10 themselves.

FIG. 3 shows a mechanism which is formed in the carrier 16 for supporting the rods 10. The carrier 16 is formed with fitting holes 17 for fitting the rods 10, respectively. Each fitting hole 17 is formed with a split slit 18, and a fastening bolt 20 is provided across the slit 18. The rod 10 is allowed to rotate with the bolt 20 being loosened but is fastened and fixed because the slit 18 is narrowed when the bolt 20 is fastened.

In this embodiment, moreover, the slit 18 is positioned at the side opposed to the other side, to which a load is applied, with respect to the fitting hole 17. As a result, the slits 18 and 18, which are formed to merge into the adjacent fitting holes 17 and 17, extend in the directions to face each other until they merge into each other. At this merging portion, there is cut another slit 19 which extends to the outside of the carrier 16. This slit 19 has an action to increase the narrowance of the slits 18, when the bolts 20 are fastened, thereby to strengthen the fastening forces of the fitting holes 17.

The transmission thus constructed is run after the back-lashes of its gears have been eliminated in the following manner by the movement adjusting mechanism composed of the aforementioned rods 10 before or after it is assembled with the power transmission system of a control apparatus such as an industrial robot.

Specifically, the sun gear 5, the internal gear 7 and the intermediate gears 8a, 8b, 8c and 8d are assembled in advance with the bolts 20 being loosened and the bracket 3a being removed. In this state, the input shaft 1 and the output shaft 2 are locked in their irrotational states, and the individual rods 10 are rotated to turn the paired diagonal intermediate shafts 9a and 9b in the direction of arrow F and the remaining diagonal intermediate shafts 9c and 9d in the direction of arrow G up to their limits. By these rotations, the intermediate gears 8a and 8b, and 8c and 8d revolve generally in the circumferential direction on the axis of the sun gear 5 so that their contacts with the gear surfaces of the sun gear 5 and the internal gear 7 come into the states without any back-lash, as shown in FIG. 2.

More specifically, in the meshing states of the intermediate gears 8a and 8b having been rotated in the direction F with the sun gear 5 and the internal gear 7, the intermediate gears 8a and 8b will rotate the sun gear 5 in the counter-clockwise direction R. In the meshing states of the intermediate gears 8c and 8d having been rotated in the direction G with the sun gear 5 and the internal gear 7, on the other hand, the intermediate gears 8c and 8d will rotate the sun gear 5 in the clockwise direction C. When these meshing states are set, a tool such as a spanner is inserted into an opening 21, which is formed in the bracket 3b, to fasten the bolts 20. Then, the slits 18 are narrowed so that the rods 10 are fixed in the carrier 16. This fastening operation can be simplified by the coactions between the slits 18 and the bolts 20.

After this setting of the back-lash to zero having been completed, the input shaft 1 and the output shaft 2 are unlocked, and the bracket 3a is mounted. If necessary, moreover, the opening 21 may be closed.

In the run of the transmission having the aforementioned meshing states set, when the input shaft 1 rotates in the clockwise direction C (or in the forward direction), the power is transmitted at a reduced ratio via the train of the intermediate gear 8c and the train of the intermediate gear 8d to the output shaft 2 but not through the train of the intermediate gear 8a and the train of the intermediate gear 8b to the output shaft 2. In the meshing states of the two trains of the other intermediate gears 8a and 8b when in the rotations in the clockwise direction C, more specifically, the intermediate gears 8a and 8b transmit no power while having clearances c in the rotating direction but follow the rotations with their other side surfaces merely contacting.

When the input shaft 1 rotates in the counter-clockwise direction R (or in the reverse direction), on the contrary, the power is transmitted at a reduced ratio via the other trains of the intermediate gears 8a and 8b to the output shaft 2 but not via the trains of the intermediate gears 8c and 8d to the output shaft 2. In the meshing states of the two trains of the other intermediate gears 8c and 8d when in the rotations in the reverse direction R, more specifically, the intermediate gears 8c and 8d transmit no power while having clearances c' in the rotating direction but follow the rotations with their other side surfaces merely contacting.

The gear trains at the side of no power transmission thus follow the rotations while maintaining the contacting states. As a result, at the instant when the rotating direction is to be switched from the forward direction C to the reverse direction R or vice versa, the gear trains at the side following in the aforementioned contacting states conducts the power transmission so that the switching is performed substantially without any back-lash. This eliminates any delay in the rotations, which might otherwise be caused by the back-lash, to ensure the accurate transmission.

In the transmission thus far described, moreover, the gear surfaces at the opposite sides are formed with the clearances c and c' so that the power transmission can be smoothed without any wedge action which might otherwise be established by the two-surface meshing engagement as experienced in the superposed dual gear construction of the prior art. In the case of the two-surface engagement of the prior art, moreover, the geometrical errors such as the shape or pitch errors of the gears cannot be absorbed. In the transmission of the present invention having the clearances c and c' at the opposite sides, on the contrary, the falls of the teeth can be admitted by the clearances c and c' to absorb the aforementioned geometrical errors.

In the embodiment thus far described, on the other hand, the intermediate gears 8a, 8b, 8c and 8d are rotatably borne on the floating intermediate ring through the clearances 14 for forming the oil films, respectively. As a result, the intermediate gears 8a, 8b, 8c and 8d are allowed to fluctuate in the radial direction of the sun gear 5 in accordance with the fluctuations of the eccentric angle due to the oil films of the aforementioned gaps 14 so that the machining errors can be absorbed. At the same time, the power is evenly distributed to the plural gear trains so that the run can be remarkably smoothed.

If, on the other hand, if the sun gear, the internal gear and the intermediate gears are made of the spur gears, as in the embodiment, the power transmission can be stabilized without any thrust during the run.

Incidentally, in the present invention thus far described, the rotational movements of the intermediate shafts 9a, 9b, 9c and 9d to be effected by the movement adjusting mechanism are conducted on the respective axes of the rods 10 so that they are not in the circumferential direction on the axis of the sun gear 5 if a strict discussion is made. However, the strokes of the intermediate shafts may be so fine as to eliminate the back-lashes so that their fluctuations exert no influence upon the effects of the present invention even with slight fluctuations in the radial direction. In the present invention, more specifically, the moving loci of the intermediate shafts by the aforementioned movement adjusting mechanism need to coincide strictly with the theoretical ones on the axis of the sun gear but are sufficient if they substantially resemble the theoretical ones.

Figure 6:
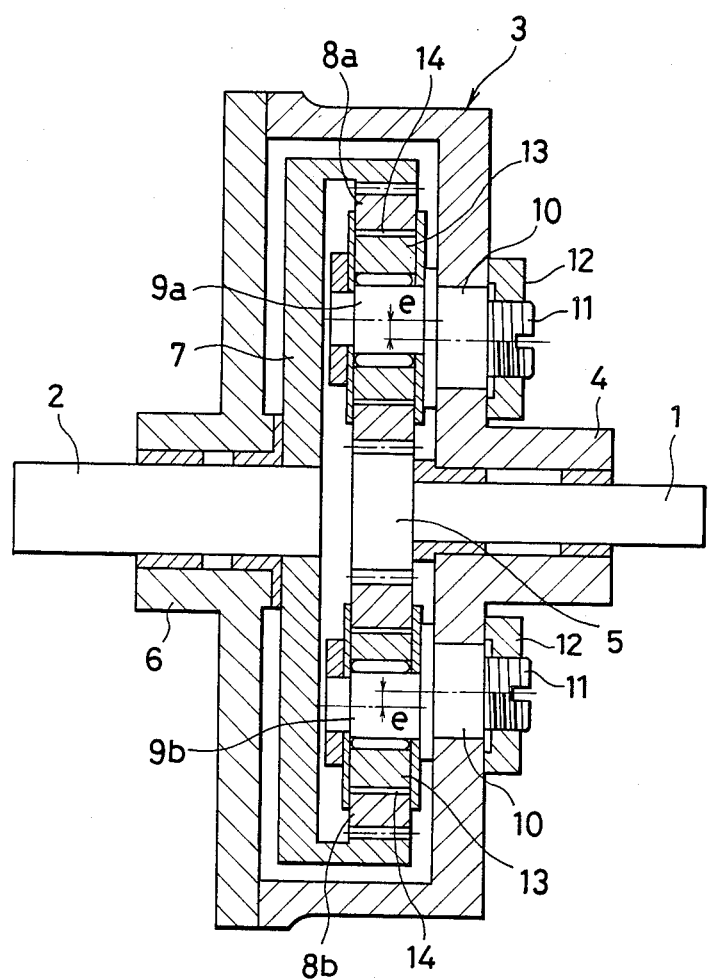
FIG. 6 is a longitudinal section showing a transmission according to another embodiment of the present invention.

Another embodiment shown in FIG. 6 presents an example of the controlling transmission in case a star gear mechanism is used.

This embodiment is absolutely identical to the first embodiment, although not specifically shown, in that two pairs of intermediate gears 8a and 8b, and 8c and 8d are interposed between the internal gear 7 and the sun gear 5, as shown in FIG. 2, but is different in that the internal gear 7 is fixed on the output shaft 2 and in that the intermediate shafts 9a, 9b, 9c and 9d of the intermediate gears 8a, 8b, 8c and 8d are fixed in the casing 3 through the rods 10, 10, 10 and 10 of the movement adjusting mechanism. Moreover, the rods 10 may be fixed in the casing 3 by any means such as screws 11 and lock nuts 12, if this means can ensure the fixing.

In the case of this embodiment, the back-lashes can also be eliminated like the embodiment of FIG. 2 to attain similar effects by making use of the movement adjusting mechanism composed of the rods.

Incidentally, the aforementioned individual embodiments are exemplified by the case in which the intermediate gears to be interposed between the sun gear and the internal gear are in two pairs, but the present invention may be practised by at least one pair. In other words, it is sufficient to have one of the paired gears meshing in the clockwise direction and the other meshing in the counter-clockwise direction. Moreover, both the aforementioned individual embodiments have been exemplified by the case of the reduction mechanism but can be applied to an over-drive gear mechanism if the aforementioned input shaft is used as the output shaft of the over-drive mechanism whereas the output shaft is used as the input shaft of the over-drive mechanism.

What is claimed is:

1. A controlling transmission comprising: a planetary gear mechanism having at least one pair of intermediate gears interposed to mesh with a sun gear and an internal gear, a shaft rotatably supporting each of said intermediate gears, means for adjusting at least one of said shafts substantially in the circumferential direction on the axis of said sun gear; and means for fixing said shaft in an adjusted position with the teeth of one of said intermediate gears of each pair contacting only one surface of the teeth of said sun gear and said internal gear and the teeth of the other intermediate gear of each said pair contacting only the other surface of said teeth of said sun gear and said internal gear, wherein each of said intermediate gears in each said pair contacts said sun gear and said internal gear to transmit power in opposite directions of rotation with each intermediate gear of each pair eliminating backlash when it is driven to transmit power in one direction of rotation and following rotation of said sun gear and said internal gear when the other intermediate gear of each said pair is driven to transmit power in the other direction of rotation.

2. A controlling transmission as set forth in claim 1, wherein floating intermediate rings are rotatably mounted on said shafts to bear said intermediate gears through small clearances.

3. A controlling transmission as set forth in claim 1, wherein said means for adjusting at least one of said shafts is constructed such that said shafts are fixedly connected to supporting rotatable rods with the axes of said shafts eccentric relative to the axes of said rods.

4. A controlling transmission as set forth in claim 3, further including a carrier for supporting said intermediate gears, a plurality of fitting holes formed in said carrier for fixing the rods of said adjusting means, a slit intersecting the side wall of each fitting hole; and a fastening bolt across each said slit and adapted to fix each of said rods by narrowing said slits.

5. A controlling transmission as set forth in claim 4, wherein the slits formed to intersect the sidewalls of two adjacent fitting holes are extended to merge into each other.

6. A controlling transmission as set forth in claim 5, wherein an additional slit is cut through said carrier to extend from the outside of said carrier to join said two merging slits at a central portion thereof and a fastening bolt is fastened across each of said two merging slits, respectively.

* * * * *